June 18, 1957 A. FINLAY, JR 2,796,475

HIGH SPEED SWITCH

Filed March 26, 1956 2 Sheets-Sheet 1

INVENTOR.
Alexander Finlay Jr.

BY Gray, Mase & Dunson

ATTORNEYS.

June 18, 1957 A. FINLAY, JR 2,796,475

HIGH SPEED SWITCH

Filed March 26, 1956 2 Sheets-Sheet 2

INVENTOR.
Alexander Finlay Jr.

BY Gray, Mase & Dunson

ATTORNEYS.

2,796,475

HIGH SPEED SWITCH

Alexander Finlay, Jr., Columbus, Ohio, assignor, by mesne assignments, to The Battelle Development Corporation, Columbus, Ohio, a corporation of Delaware Application March 26, 1956, Serial No. 573,847

9 Claims. (Cl. 200—32)

This invention relates to high-speed electrical switch mechanisms. More particularly, it has to do with a mechanically driven high-speed switch mechanism for multiple contact switching comprising a combined low-level and high-level switch having synchronous switching action.

A need exists for a multiple element high-speed switch with a very low level of generated noise. Switches of this sort are often required where large numbers of voltage generating elements are successively connected to a single lead. Many of the voltage generating elements used in this manner are fundamentally low-level signal generating devices or must be used at low-excitation levels. Many of these devices also have high internal impedances so that the actual amount of power available is quite small. A few examples of such signal generating devices are thermocouples, strain gages, and light-sensitive devices, such as cadmium sulfide or lead sulfide cells.

Many switching applications are such that after the low-level signals have been switched, amplification is necessary. After amplification, one is frequently faced with the problem of returning to the original multichannel form of information to operate output response devices, such as display and recording instruments. Thus, a second switching operation does not have to have the same low level of generated noise as the first switch device since amplification has strengthened the signals.

Gangs of a plurality of low-level switches are not capable of handling in a practical manner the magnitude of the currents needed to operate high-level mechanisms. Low-level switches for multiple contact switching have inherent limitation on maximum currents capable of being switched. These inherent limitations for low-level switches may arise from constructional features incorporated to obtain minimum noise generation.

Gangs or plurality of high-level switches are not capable of handling a low-level input current, primarily because of excessive noise generation. While no theoretical limitation may exist for the minimum input currents, a practical limitation in input current is reached in a high-level switch when the noise level generated by the switch is sufficient to interfere with the detection of the small input current handled.

A suitable switch mechanism for many switching applications may comprise a combination of a low-level switch and a high-level switch, wherein the low-level input signals are switched by the low-level switch, amplified by a suitable means, switched by the high-level switch, and used for operation of output response devices. One requirement for mechanisms of this type would be that the operation of high-level switch component needs to be in synchronism with the operation of low-level switch component. Another requirement, in addition to synchronization, is mechanical coincidence or phasing so that both the low-level and high-level switch components operate in phase.

In a switch mechanism comprising a combination of a low-level switch component and a high-level switch component, one means to accomplish synchronism may be synchronous motors for each switch component operating from the same power supply line. Even though this means might accomplish synchronization, a separate means would be necessary to assure mechanical coincidence or phase of both switch components every time operation of the switch mechanism was commenced.

Preferably a suitable switch mechanism is small and light, is low in the consumption of driving power, has good electrical and mechanical characteristics, is reliable in operation, has a large number of contacts, is capable of scanning these contacts rapidly, has a low electrical noise level from operation of a low-level switch component, has a nontroublesome noise level from operation of a high-level switch component, and has satisfactory synchronization and mechanical coincidence or phasing of the low-level and high-level switching closures.

Heretofore, switches and switch mechanisms of the prior art have had various shortcomings, and no prior art switch device has been able to fulfill all the requirements fulfilled by the switch mechanism of this invention. Prior art switches are not known to be available that are capable of operation without appreciable electrical noise at the speeds the mechanism of this invention permits. Further, in many applications of this invention, reductions in complexity of equipment may be made, as a single amplifier may be used for all circuits.

In the present invention, the low-level and the high-level switch components are mechanically driven by a common driving means that assures synchronization. With a common driving means, synchronization is maintained in spite of variations in the driving energy. Manufacturing economy and switch compactness are obtained by the utilization of a combined low-level and high-level switch having some common parts for the high-level and low-level switch components, and by the use of a single power source of a less expensive type than synchronous-type power sources. Mechanical coincidence or phasing between the high-level and low-level switch components is obtained by adjustment of the position of the high-level switch contact members relative to the position of the low-level switch contact members upon commencement of initial operation. Thereafter, this adjustment of the switch mechanism need not be repeated as long as the relative positions of the contact members are unchanged. Thereafter, each time switch operation is interrupted and recommenced, synchronization and mechanical coincidence is assured.

The present invention is capable of monitoring signal generating devices, such as thermocouples where large numbers of temperatures are observed or checked frequently, photosensitive devices where a large number of individual cells are scanned, and a plurality of strain gage output signals. In addition, the present invention may be used to generate functions for use in analog computers.

A primary object of the present invention is to provide an electrical switch mechanism comprising a novel and useful combination for switching low-level signals in synchronization and mechanical coincidence with high-level signals.

Another object of this invention is to provide a high-speed multiple-contact electrical switch mechanism having good electrical characteristics, good mechanical characteristics, and reliable operation.

Still another object of this invention is to provide an electrical switch mechanism, capable of scanning a plurality of low-level contact members rapidly so that low-level signals may be switched using these contact members and capable of simultaneously scanning a plurality of high-level contact members so that high-level signals may be switched in synchronization and mechanical coincidence with the low-level signals switched.

Still another object of the invention is to provide a mechanically driven electrical switch mechanism having a common driving means, a common centrifugal pump, and common housing members for a low-level switch component and a high-level switch component.

Further objects and advantages of this invention will be readily seen and appreciated as the same become better known and understood by the following detailed description and the accompanying drawings when considered in conjunction with the claims.

The high-speed electrical switch mechanism of this invention comprises a low-level switch component and a high-level switch component having a common driving means, a common centrifugal pump or rotor, and a common housing means. Two rotary jets of mercury are forced from orifices of the common centrifugal pump of the mechanism of this invention with the one jet striking contact members of the high-level switch component and with the second jet striking a diaphragm contact means of the low-level switch component. Synchronization of the switching actions of the two components is assured by having a common power source and driving means. Mechanical coincidence or phasing of the switching action of the two components is assured by providing an adjustment means for the positioning of the low-level and high-level contact members relative to the rotating mercury jets on commencement of initial operation of the mechanism of this invention.

In the present invention the low-level switch component comprises a plurality of contacts, a diaphragm contact means comprising electrically conducting material spaced from the contacts in the absence of flexure, and a means for providing in successive portions of said diaphragm means flexure toward the contacts to provide electrical contact between the diaphragm means and each of the contacts successively. In the preferred form of the low-level switch component, the centrifugal force of a rotating jet of mercury impinging against a thin metal diaphragm contact means causes the diaphragm contact means to deflect and to make electrical contact with successive contact members to close the low-level switch contacts and complete electrical low-level circuits. As the rotating mercury jet passes the region adjacent a contact member, the diaphragm means springs back away from the contact member, opening the switch, and breaking the electrical circuit. In the low-level switch component, the jet of mercury does not comprise any part of the circuit but is used only to provide the force that deflects the diaphragm means and closes the contacts. A low-level switch component of this type provides a low-noise, high-speed rotary switch in which the movement of the contact members is small, in which the contact members are electrically shielded from the fast-moving members and materials producing switching action, and in which the contact members are not exposed to the atmosphere inside the switch. Low-level switch components of this type are more fully described in a copending patent application, Serial No. 479,385, by Alexander Finlay, Jr., entitled "Multiple Contact Switch," filed January 3, 1955.

The high-level switching component of the present invention is a mercury jet switch of a type known in the prior art. In a high-level switch component of this type a centrifugal pump with a small orifice in the outside of the pump motor is used. Mercury is forced through the orifice and strikes successive high-level contact members mounted in the housing of the switch mechanism. Electrical high-level circuits are completed successively through the mercury jet and the individual high-level contact members as the rotor turns. In this high-level switch component, the jet of mercury is a part of the electrical circuits. A circuit is closed, when the jet of mercury strikes a contact member. As the jet of mercury moves past the contact member, the circuit is opened until the jet approaches and once again strikes the contact member. While considerable electrical noise is generated by a high-level switch component of this type in comparison to the low-level switch component of this invention, the noise is not of sufficient strength to cause trouble for high-level applications since the signal has been amplified before being switched by the high-level switch component.

Figure 1:
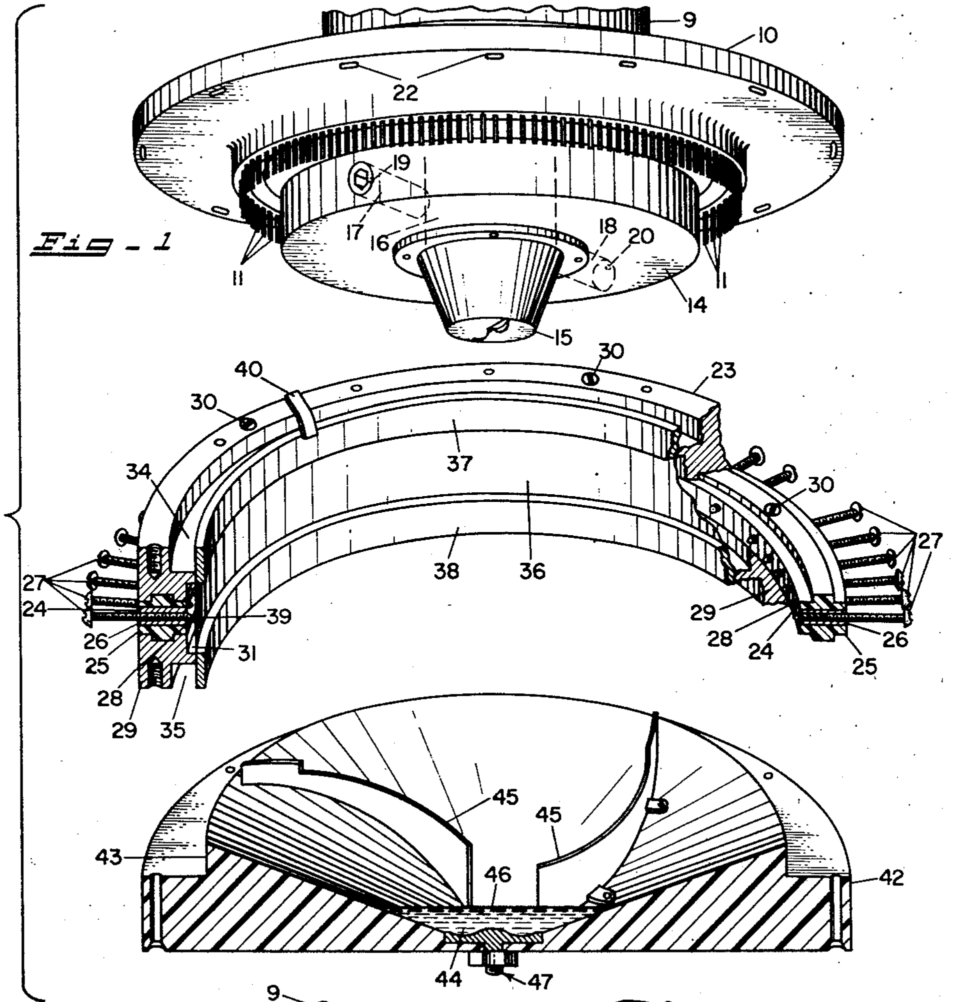
Fig. 1 is an exploded perspective view, partly cut away, of a preferred form of the switch mechanism according to this invention.
Figure 2:
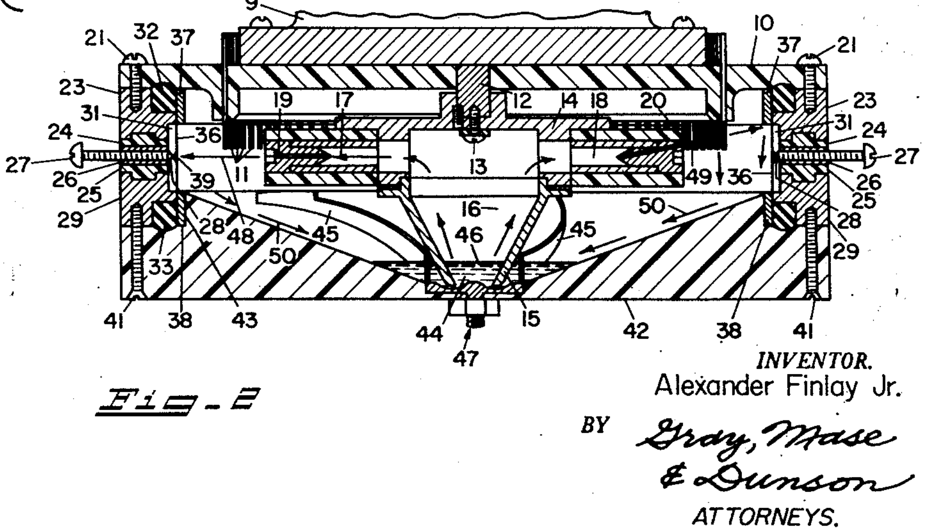
Fig. 2 is a cross-sectional view of the switch mechanism of Fig. 1.

Referring to Figs. 1 and 2, a motor 9 of any convenient type, such as a universal series-type electric motor, is mounted on a top housing member 10 of a suitable insulating material. A plurality of high-level contact members 11 of a suitable conducting material, such as stainless steel, are mounted in and extend down from the top housing member 10 in an annular arrangement. The motor 9, having a shaft 12, is connected by a screw attachment means 13 to drive a rotor 14 including a mercury pickup scoop 15. A vertical conical passage 16 through the mercury pickup scoop 15 and two radial passages 17 and 18 communicating therewith are provided in the rotor 14. One end of radial passage 17 terminates in the small orifice 19 and one end of radial passage 18 terminates in the small orifice 20. The top housing member 10 is tightly secured as by a plurality of screws 21 through slotted holes 22 to an upper cylindrical side housing member 23. Affixed to the upper cylindrical side housing member 23 is an intermediate split-ring cylindrical side housing member 24 of any suitable insulating material. Affixed to the intermediate split-ring cylindrical side housing member 24 is a second intermediate split-ring cylindrical side housing member 25 of any suitable insulating material. Mounted radially between the two intermediate split-ring cylindrical side housing members 24 and 25 are a plurality of inserts 26 of a metal, such as brass. A plurality of low-level contact members 27 made of any suitable conducting material are mounted radially, one to each insert 26, through the inserts 26. The inner end of each low-level contact member 27 preferably is coated with silver or other good contact material as indicated at 28. Each low-level contact member 27 preferably is threaded and is in threaded engagement with the insert 26 so that the position of the contact end 28 can be accurately adjusted and secured. Affixed to the lower intermediate split-ring cylindrical side housing member 25 is a lower cylindrical side housing member 29. A plurality of fillister-head screws 30, countersunk in aligned holes in upper cylindrical side housing member 23, hold intermediate split-ring side housing members 24 and 25, and upper and lower cylindrical side housing members 23 and 29, securely together. The inner end 28 of each low-level contact member 27 protrudes in a central annular recess 31 formed in the side housing members 23, 24, 25, and 29. Rubber O-rings 32 and 33 fit snugly in an upper and a lower annular recess 34 and 35, respectively, of the upper and lower side housing members 23 and 29, respectively.

A ring-shaped diaphragm 36 made of thin metal, preferably stainless steel, is rigidly secured as by spot welding to the outer surface of an upper support ring 37 and to the outer surface of a lower support ring 38. The diaphragm assembly 36, 37, and 38 fits snugly against the side housing members 23 and 29 and the O-rings 32 and 33. The middle portion of the outer surface of the diaphragm 36 which is located opposite the inner ends 28 of the low-level contact members 27 preferably is coated with silver or other good contact material as indicated at 39. At least one ground strap 40 provides electrical connection to the diaphragm assembly 36, 37, and 38.

The lower side housing member 29 is tightly fastened as by a plurality of screws 41 to a bottom housing member 42 having an annular shoulder 43 that presses the lower support ring 38 of the diaphragm assembly 36, 37, and 38 in fluid-tight assembly against the side housing member 29 and the lower O-ring 33 and holds the upper support ring 37 of the diaphragm assembly 36, 37, and 38 in a fluid-tight assembly against the side housing member 23 and the upper O-ring 32.

The inner surface of the bottom housing member 42 forms an inverted truncated cone with an annular groove adjacent its frustrum forming a mercury sump 44 having a raised central portion. A plurality of curved vertical baffles 45 are rigidly fastened to the bottom housing member 42. The mercury sump 44 contains a pool of mercury 46. Mounted in bottom housing member 42 is a mercury contact member 47 of any suitable conducting material that contacts the pool of mercury 46 and protrudes exteriorly of bottom housing member 42.

Emerging from orifice 19 is a jet of mercury, designated as low-level mercury jet 48. Emerging from orifice 20 is a jet of mercury, designated as high-level mercury jet 49. The direction of flow of mercury in the switch mechanism is indicated by the arrows 50.

Figure 3:
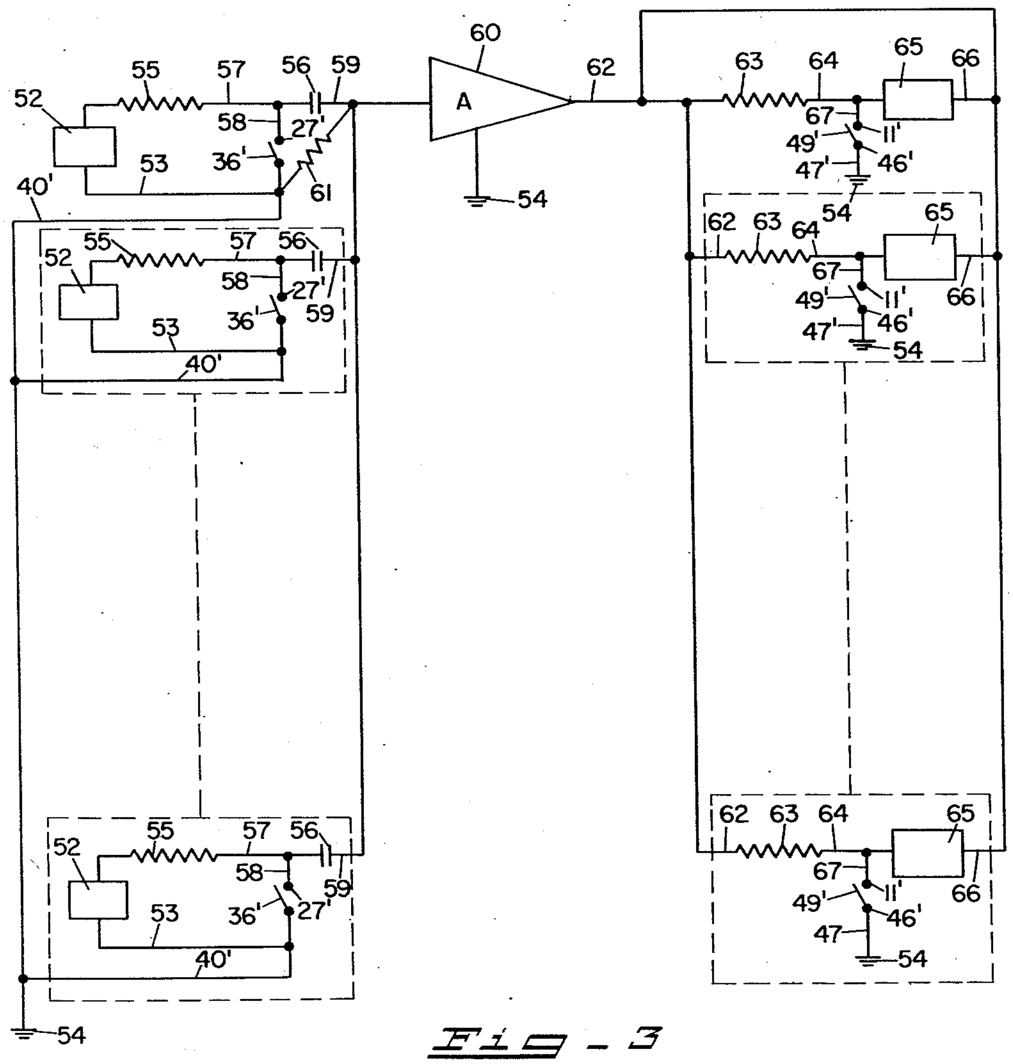
Fig. 3 is a simplified block diagram of a suitable circuit for the switch mechanism of this invention.

In Fig. 3 each of a plurality of voltage generating or signal generating devices 52 are connected from one terminal by a conductor 53 to a diaphragm means 36′, which is connected by a ground strap 40′ to a common ground 54. Each of the signal generating devices 52 has an internal impedance resistance, designated 55, and connects to a capacitor 56 by means of a conductor 57. A conductor 58 connects each conductor 57 to one of the low-level contact members 27′. From each capacitor 56 a conductor 59 leads to an input terminal of an amplifier 60. A resistor 61, having a greater resistance than impedance resistance 55, connects conductor 59 and ground strap 40′. An output terminal of amplifier 60 is connected by a conductor 62, a resistor 63, and a conductor 64 to a terminal of each output response device 65. The remaining terminals of amplifier 60 connect to the ground 54. A second terminal of each output response device 65 connects by a conductor 66 to the conductor 62. A conductor 67 connects each conductor 64 to one of the high-level contact members 11′. High-level mercury jet 49′ through mercury pool 46′, mercury contact member 47′, and the connected ground 54, functions as a contact member for each high-level contact member 11′.

The switch operates as follows:

The motor 9 drives the shaft 12 causing the rotor 14 and the pickup scoop 15 to rotate in the mercury sump 44 and to impart rotary motion to the mercury pool 46 therein. The centrifugal forces resulting from the rotary action of the mercury pool 46 cause mercury to be forced away from the center of rotation and since the wall of the vertical passage 16 is conical with its largest diameter at the top, the mercury is forced upward into the radial passages 17 and 18. At the end of radial passage 17 the mercury is forced through the orifice 19 providing a low-level mercury jet 48 having substantial pressure. Similarly, at the end of passage 18, the mercury is forced through the orifice 20 providing a high-level mercury jet 49 having substantial pressure.

The continuous stream of mercury provided by the centrifugal force of rotation through the orifice 19, as designated as low-level mercury jet 48, is directed in a substantially horizontal path and impinges against the annular diaphragm 36 deflecting the diaphragm outwardly against the successive low-level contact members 27. Thus, as the rotor 14 rotates and as the point of impingement progresses around the diaphragm 36 there is provided a successive closing of the respective circuits to which the low-level contact members 27 and the diaphragm 36 are connected.

After the mercury from the mercury jet 48 impinges on the diaphragm 36, it tends to continue in a horizontal path for a short distance and then flows down the conical inner surface of the bottom housing member 42 into the mercury sump 44.

A continuous stream of mercury provided by the centrifugal force of rotation through the orifice 20, as designated as high-level mercury jet 49, due to the configuration of the orifice and the location of the orifice channel is directed slightly upward and impinges against successive high-level contact members 11, thus providing successive closing of the respective circuts to which the high-level contact members 11 and the high-level mercury jet 49 are connected, as the rotor rotates and as the mercury jet 49 progresses around the annular arrangement of high-level contact members 11.

After the mercury from mercury jet 49 strikes the high-level contact members 11 it drops or flows to the inner surface of the bottom housing member 42 and into the mercury sump 44. The mercury from jet 49, not striking the high-level contact members 11, but instead passing between the high-level contact members, impinges upon the inner surface of the upper support ring 37 and then drops or flows to the bottom housing member 42 where it flows down the conical inner surface of the bottom housing member 42 into the mercury sump 44.

Thus, the mercury from the mercury jets 48 and 49, after effecting or completing contact closure for the corresponding low-level and high-level contact members 27 and 11 returns to the mercury sump 44 to provide a continuous supply of mercury for the switch mechanism operation. The vertical baffles 45 interrupt the rotational component of motion of the mercury preventing undesirable swirl as mercury flows back into the mercury sump 44. The direction of flow of the mercury in the switch mechanism is indicated by the arrows 50.

In the form of a switch mechanism, as illustrated, using a single annular diaphragm, the diaphragm assembly 36, 37, and 38 through ground strap 40 provides a common deflective contact for each low-level circuit. Low-level contact members 27 provide the fixed contact members for each respective low-level circuit of the low-level switch component.

High-level mercury jet 49 through the mercury pool 46 and the mercury contact member 47 provides a common rotating contact for each high-level circuit. The high-level contact members 11 provide the fixed contact members for each respective high-level circuit of the high-level switch component.

In operation of the switch mechanism with the circuit diagram, as illustrated in Fig. 3, a low-level signal pulse from any one of a plurality of signal generating devices 52 by means of a circuit comprising internal impedance resistance 55, conductor 57, capacitor 56, conductor 59, resistor 61, and conductor 53 causes a potential on the plates of capacitor 56, when the low-level switch contacts are open. When the low-level switch contacts are closed, as by deflection of diaphragm means 31′ to contact low-level contact member 27′, the potential on capacitor 56 discharges through a circuit comprising low-level contact member 27′, conductor 58, conductor 57, capacitor 56, resistor 61, diaphragm 36′, ground strap 40′, and ground 54, thus causing a pulse which proceeds along conductor 59 to an input terminal of an amplifier 60. The pulse proceeds through the amplifier and exits from an output terminal of the amplifier 60. The amplified pulse from the amplifier 60 by means of a circuit comprising conductor 62, resistor 63, conductor 64, output response device 65, and conductor 66 cannot cause a potential across the terminals of the output response device 65, when the high-level switch contacts are open, since both terminals of output response device 65 connect to conductor 62. When the high-level switch contacts are closed, as by contact of high-level mercury jet 49' with a high-level contact member 11', a potential is produced across resistor 63, since resistor 63 is connected between the output terminals of the amplifier when the high-level switch contacts are closed. Production of the potential across resistor 63 produces a pulse in the circuit comprising conductor 62, conductor 66, output response device 65, conductor 64, conductor 67, high-level contact member 11', high-level mercury jet 49', mercury pool 46', mercury contact member 47', and ground 54, thus actuating the output response device 65. In the illustrated circuit diagram of Fig. 3 the closure of the low-level contacts should be in synchronism with a corresponding closure of the high-level contacts and there should be mechanical coincidence or phasing of the low-level and high-level contact closures so that a known output response device may be operated by a known signal generating device.

Each of the signal pulses of the respective low-level circuits, after switching by the low-level switch component of this invention, is amplified by a suitable amplification means; and then flows to the high-level switch component of the switch mechanism of this invention. Numerous suitable amplifying means are known to the art. Depending upon the minimum signal input, and the desired signal output, with due consideration for electrical noise generation by the amplifying means, a suitable choice of amplifying means may be made.

While in the form of the switch mechanism of the invention, as illustrated in Figs. 1 and 2, the low-level contacts 27 are shown as preferably mounted in metal inserts 26 in the intermediate split-ring cylindrical side housing members 24 and 25, the low-level contacts 27 may be mounted radially in the intermediate split-ring cylindrical side housing members 24 and 25 without utilizing metal inserts 26. However, there are distinct advantages in the preferred illustrated mounting, as the metal inserts 26 provide a means for attaching conductors from signal generators without attaching a conductor directly to the contact member. If the metal inserts have a longitudinal notch at the outer end, the low-level contact members, after adjustment to a suitable contact position, may be locked in position by squeezing the notched portion of the inserts tightly against the contact members.

In the preferred embodiment of the switch mechanism as illustrated in Figs. 1 and 2, the radial passages 17 and 18 terminating in orifices 19 and 20 lie 180 degrees apart on the rotor 14. Accordingly, each respective switch mechanism circuit utilizes a high-level contact member 11 and a low-level contact member 27 that lie 180 degrees apart. The screws 21 through slotted holes 22 in the top housing member may be loosened slightly and the top housing member 10 with the high-level contact members 11 may be rotated slightly with respect to the other housing members 23, 24, 25, 29, and 42 of the switch mechanism. Mechanical coincidence or phasing of low-level and high-level contact closures is experimentally determined upon initial operation of the switch by rotating slightly the top housing member 10 with respect to the other housing members 23, 24, 25, 29, and 42, until the positions of the low-level and high-level contact members 27 and 11 relative to the rotating jets 48 and 49 permit simultaneous low-level and high-level contact closures. The top housing member 10 is then secured in this position by a means such as tightening of the screws 21 through slotted holes 22. To facilitate the obtaining of this mechanical coincidence, it is desirable to make the high-level contact members 11 of a size that assures a greater on-time for each respective high-level circuit than the on-time for each respective contact closure of the low-level switch component.

In the illustrated embodiment of the switch mechanism using a single annular diaphragm of stainless steel of 0.0025-inch thickness, and a spacing from the low-level contact members so that a deflection in the order of 0.004 inch could occur, there was no apparently troublesome contact bounce or diaphragm oscillation after the mercury jet had excited a particular part of the diaphragm. It is believed that because of the particular physical shape of the diaphragm no resonance exists having a "Q" great enough to cause a sustained mechanical oscillation. Any noise generated in the low-level switch component appeared to be negligible.

Noise generated in the low-level component of the switch mechanism was found to be negligible for the purposes of this invention and can be minimized by providing a film of oil or similar material on the surfaces in the annular space bounded by the annular recess 31 having coating 39 of the diaphragm 36 therein. For example, tests were made over a band width of 20 cycles to 100 kilocycles with a load of 20,000 ohms connected to the low-level contact member. To monitor the operation of the contacts, an amplifier with an over-all gain of 10,000 was used in conjunction with a 304A-type oscilloscope. The test showed a noise level so low that closure of a low-level switch contact was not detectable through the noise of the amplifying equipment used. Signal pulse levels as low as 10 to 30 microvolts were easily monitored by the switch mechanism.

The high-level switch component of the switch mechanism generated some electrical noise. However, so long as the noise generation was low in comparison with the amplified signal pulse being switched, no trouble was encountered. In the switch mechanism of this invention, where the signal pulse of the respective low-level switching circuits are amplified before being switched by the high-level component, no troubles were encountered. In the high-level switch component, there is little noise until the time just proceeding contact closure, when the random noise increases to about 1 millivolt. A large random noise pulse is produced upon contact closure and the pulse continues for a period of at least three to four times the length of the closed circuit interval. The average noise generated in the high-level switch component of the switch mechanism of this invention was found to be in the order of 1 to 3 millivolts across 20,000 ohms, when measured over a band width of from 20,000 to 100,000 cycles. The noise was apparently due to the breaking up of the mercury stream as it strikes the contact members. It appears that separating of the mercury into individual particles is accomplished by unequally distributed electrical charges among the particles. As a result, charged particles may strike high-level contact members in the switch, and when the charges on these particles are dissipated, electrical noise is generated. This noise was reduced somewhat when the high-level contacts were shielded so as to minimize the possibility of adjacent contact members being struck by random particles. However, it was not found possible to shield the high-level contacts sufficiently to prevent noise from being produced in the period just after contact had been made.

A typical embodiment of the switch of Figs. 1 and 2 has 106 low-level contact members and 106 high-level contact members with all contacts scanned in 0.01 second. Electrical noise level of the low-level switch component is so low that it is masked by the noise generated by the amplifying equipment. The electrical noise level of the high-level switch component is low enough to be negligible when signal levels are 10 to 20 volts in the high-level switch component. The over-all mechanism is approximately 5½ inches in diameter and 5 inches high including the driving motor, or 1½ inches high excluding the driving motor. The weight including the driving motor is about 4 pounds. Tests show very clean, reliable contact with an on-time of about 50 to 60 microseconds for the low-level component with a current of about 50 microamperes flowing through the low-level contacts, and of about 60 to 70 microseconds for the high-level component with a current of about 25 amperes flowing through the high-level contacts. Approximately 40 watts power is required to drive the switch mechanism. The jet orifices are each 0.0135 inch in diameter and are drilled in a rotor 3 inches in diameter. The speed of the mercury jet from the orifices is about 100 feet per second, when the rotational speed of the switch is 6,000 revolutions per minute, which provides a basic contact closure rate of 10,600 contacts per second for the low-level contacts and 10,600 contacts per second for the high-level contacts. The low-level contact members have a silver coating on their contact surfaces. The annular diaphragm is 0.002 inch thick stainless steel having a coating of silver on the contact side. The low-level contact members are adjusted for approximately 50 percent on-time so that at the speed of 6,000 revolutions per minute each contact remained closed for about 50 microseconds. The high-level contact members, stainless steel rods approximately 1/16 inch in diameter, permit 60 to 70 percent on-time for the high-level switching. These high-level contact members appear to be sufficiently rigid to withstand the forces of the mercury jet.

A model of the switch mechanism of this invention was tested for 500 hours of continuous operation and found to be capable of operating for such a period with a minimum of maintenance. Continuous operation was accomplished for this period without mechanical failure, although it became necessary to readjust the position of the low-level contact members after approximately 400 hours.

There are other modifications of this invention, not illustrated, that will be obvious to those skilled in the art, and these modifications also are included as being in the spirit and scope of this invention.

In one modification, not illustrated, the switch mechanism is identical to the embodiment as illustrated in Figs. 1 and 2 except for a modified low-level switch component. In this modified low-level switch component, no ring-shaped diaphragm assembly 36, 37, and 38 is found. An upper side housing member and a lower side housing member are similar to the respective members 23 and 29, as illustrated, except that upper support ring 37 and lower support ring 38 are integral portions of the respective upper and lower side housing members. Instead of the ring-shaped diaphragm there are provided individual unit diaphragm members, as illustrated and more fully described in a copending patent application, Serial No. 479,385, by Alexander Finlay, Jr., et al., entitled "Multiple Contact Switch," filed January 3, 1955. A unit diaphragm member preferably shaped like a tiny pie pan with a flat, circular body and a shallow conical periphery is provided for each individual low level contact member. These unit diaphragm members are fixed by a suitable means to the intermediate split-ring cylindrical side housing members making a fluid-tight assembly, preferably with the flat circular body of the unit diaphragm member flush with the inner surface of the intermediate side housing members. Threaded cylindrical metal plugs in the intermediate split-ring cylindrical side housing members are a suitable means to hold the unit diaphragm members in a fluid-tight assembly, where the metal plugs hold the unit diaphragm members by pressure engagement of the shallow conical periphery of the unit diaphragm member against tapered cylindrical openings in the intermediate side housing members, if provision is made to adequately insulate the metal plug from the individual low-level contacts. Each unit diaphragm member preferably is coated on the contact end with silver or other good contact material. The threaded metal plug means holding the unit diaphragm members may by a ground strap means be grounded to provide a common circuit member, or individual conductors for each low-level circuit may be attached to a portion of each metal plug to provide individual low-level circuits. The operation of this modification, not illustrated, is similar to the illustrated embodiment except for the functioning of the low-level switch component. As the rotor rotates, the mercury jet alternatively strikes a unit diaphragm member and the inner surfaces of the intermediate side housing members. Each unit diaphragm member, when struck by the mercury jet deflects and contacts an individual low-level contact closing the circuit for that particular low-level circuit. As the mercury jet proceeds to the adjacent housing surface, the unit diaphragm member recovers, thus opening the circuit. Successive unit diaphragm members are deflected and successive low-level signal pulses switched as the rotor rotates. A baked-on layer of varnish preferably 0.008 inch thick on the outer portion of the contact surface of the unit diaphragm member not contacting the low-level contact members will provide sufficient damping to avoid objectional oscillation of the unit diaphragms.

In any application where it might be necessary to provide low-level switching of circuits not having a common ground or other common connection, a thin layer of insulation can be provided in the region of contact on the diaphragm means, and a small contact can be mounted thereon opposite each fixed low-level contact member and connected by a flexible insulated conductor to an insulated binding post on the outside of the switch housing.

To provide switching of a large number of circuits, switch mechanisms of the present invention may be ganged using a single driving motor in obvious ways. More than one pair of jets of mercury may be used where it is desired to close the circuits more than once during a single rotation of the rotor. The rotor speed may be varied by known means to decrease or increase the number of circuits opened and closed in a unit period of time. While a single amplifying unit is preferred, a plurality of amplifying units may be used for groups of circuits or for individual circuits if desired.

While the forms of the invention herein disclosed constitute preferred embodiments, it is not intended herein to describe all the possible equivalent forms or ramifications of the invention. It will be understood that the words used are words of description rather than of limitation and that various changes, as in shape, relative size, and arrangement of parts may be made without departing from the spirit or scope of the invention herein disclosed.

What is claimed is:

1. A switch mechanism comprising: a low-level switch component having a plurality of contacts and diaphragm means including an electrically conducting material spaced from said contacts in the absence of flexure; a high-level switch component having a plurality of contacts; and means for applying rotary motion to a conductive liquid and for directing said liquid in a plurality of rotating jets with at least one of said jets impinging against said diaphragm means to provide flexure of said diaphragm means into contact with said contacts of said low-level switch component successively and with at least one of said jets impinging against said contacts of said high-level switch component successively; so constructed and arranged that when said diaphragm means contacts at least one of said contacts of said low-level switch component at least one of said jets simultaneously impinges against at least one of said contacts of said high-level switch component.

2. A switch mechanism according to claim 1, including means for adjusting the position of said plurality of contacts of said high-level switch component relative to said plurality of contacts of said low-level switch component.

3. A switch mechanism comprising: a first plurality of spaced contacts arranged in a circle; diaphragm means closely spaced inwardly from each of said first plurality of contacts in the absence of flexure and capable of flexing outwardly into electrical contact with said contacts; a second plurality of spaced contacts arranged in a circle; and means for applying rotary motion to a conductive liquid and for directing said liquid in a plurality of rotating jets, with at least one of said jets impinging against successive portions of said diaphragm means to provide outward flexure thereof toward each of said first plurality of contacts successively, and with at least one of said jets impinging against each of said second plurality of contacts successively.

4. A switch mechanism according to claim 3, in which said liquid comprises mercury, and including means for conducting said liquid to said means for applying rotary motion after impingement against said diaphragm means and said second plurality of contacts.

5. A rotary switch mechanism comprising: a plurality of spaced contacts arranged in a plurality of circles; thin metal diaphragm means closely spaced inwardly from at least one of said plurality of circles of contacts in the absence of flexure and capable of flexing outwardly into electrical contact with said contacts; a rotor for applying rotary motion to a conductive liquid and for directing said conductive liquid in a plurality of rotating jets, by virtue of centrifugal force; driving means for said rotor; at least one of said plurality of jets being directed to impinge against successive portions of said diaphragm means adjacent said contacts to provide electrical contact between said diaphragm means and each of said contacts successively; and at least one of said plurality of jets being directed to impinge against each contact of at least one of said plurality of circles of spaced contacts successively; so constructed and arranged that when said diaphragm means electrically contacts at least one of said contacts closely spaced outwardly therefrom at least one of said jets simultaneously impinges against at least one of the contacts of said circles.

6. A switch mechanism according to claim 5, in which said diaphragm means comprises an annular diaphragm member.

7. A switch mechanism according to claim 6, including means for adjusting the position of at least one of said plurality of circles of spaced contacts relative to at least one other said circle of spaced contacts.

8. A rotary switch mechanism comprising: a cylindrical housing; a first plurality of contact members mounted in and insulated from said housing and arranged in spaced relationship in a circle with their contact surfaces facing inwardly; an annular diaphragm in said housing located adjacent said first contact surfaces, with the outer surface of said diaphragm closely spaced from said first contact surfaces; a second plurality of contact members mounted in said housing, arranged in spaced relationship in a circle with their contact surfaces facing inwardly; a sump containing a conductive liquid in said housing; rotor means including a pickup scoop immersed in said liquid and having a passage therein for conducting liquid from said sump by means of centrifugal force and communicating with a plurality of orifices in said rotor for directing a plurality of jets of said liquid, at least one of said jets being directed against said diaphragm toward said first contacts, and at least one of said jets being directed against said second contact surfaces; and means for rotating said rotor; wherein liquid from said sump is driven by centrifugal force through said passage and said orifices with at least one of said jets impinging against said diaphragm along a line adjacent to said first contact surfaces, progressively flexing said diaphragm into contact with each of said first contact surfaces in succession, and with at least one of said jets impinging against said second contact surfaces in succession.

9. A switch mechanism according to claim 8 in which said conductive liquid comprises mercury; including means for conducting said liquid to said sump after impingement against said diaphragm and said second contact surfaces; in which said annular diaphragm is rigidly secured to a supporting ring at each end; and in which a liquid-tight sealing means is provided between each end of said supported diaphragm and said cylindrical housing, whereby the contacting portions of said diaphragm and said first contact members are isolated from said liquid and the rotating atmosphere in said switch mechanism.

No references cited.